May 29, 1962 W. A. HORNING 3,036,964
CONTROL METHOD AND APPARATUS
Filed Nov. 12, 1957 2 Sheets-Sheet 1

Wendell A. Horning
INVENTOR.
BY Albert Rosen
Morris Liector
ATTORNEYS

May 29, 1962  W. A. HORNING  3,036,964
CONTROL METHOD AND APPARATUS
Filed Nov. 12, 1957  2 Sheets-Sheet 2
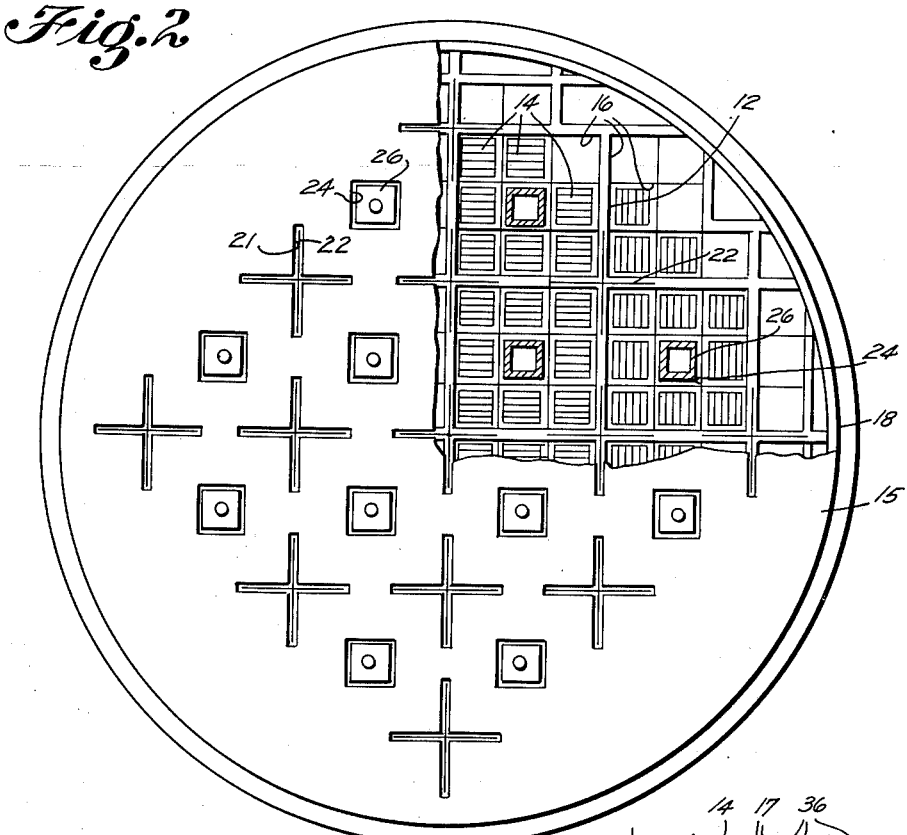
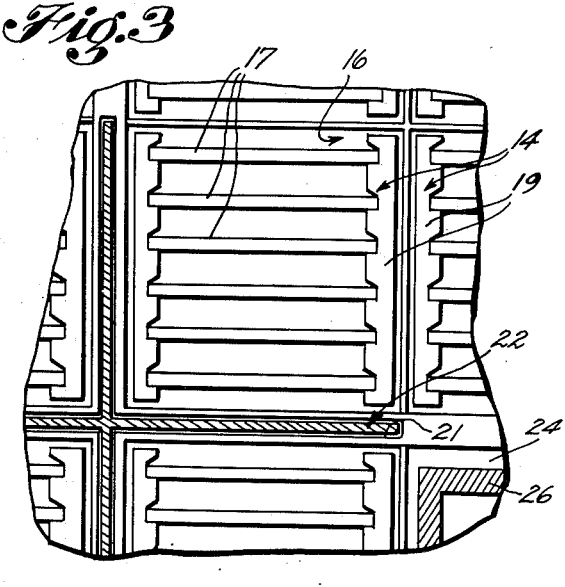
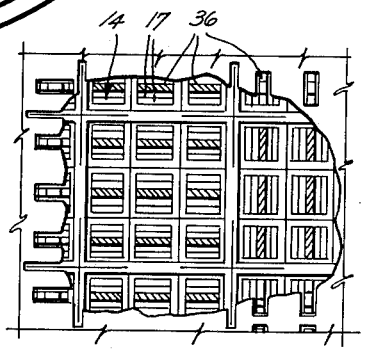
Wendell A. Horning
INVENTOR.
BY Albert Rosen
ATTORNEYS United States Patent Office 3,036,964
Patented May 29, 1962

3,036,964
CONTROL METHOD AND APPARATUS
Wendell A. Horning, Playa del Rey, Calif., assignor, by mesne assignments, to Thompson Ramo Wooldridge Inc., Cleveland, Ohio, a corporation of Ohio
Filed Nov. 12, 1957, Ser. No. 695,729
3 Claims. (Cl. 204—154.2)

This invention relates to a control method and apparatus useful in the nuclear reactor art and, while not limited thereto, will be described herein as embodied in a nuclear reactor of the boiling water moderated variety.

As is known, a boiling water nuclear reactor must, for safety reasons, be under-moderated when the reactor is started from a zero power level. By under-moderated it is meant that the density of the moderator is less than that required for maximum reactivity with a given density of fissionable material. Failure to under-moderate during startup is potentially dangerous. As a result one present practice is to start to operate such reactors at lower "normal" power level than would be most desirable. Such operation results in the reactor power level being established at a point on the reactivity curve which is subject to major changes in reactivity with small changes in moderator effectiveness. As a result, when the reactor realizes normal power level operation the constantly changing moderation caused by random changes in steam volume greatly increases the tendency of the reactor power output to oscillate with destructive amplitude. Thus, in typical cases the actual reactor power output must be restricted to about one-fifth of its designed capacity to avoid these oscillations.

Accordingly, one object of the invention is the provision of an improved control method and apparatus for operating a nuclear reactor at a power level substantially at its designed capacity without destructive oscillations.

Another object is to provide improved apparatus for changing the effective density of a nuclear reactor moderator during operation of the reactor.

The foregoing and related objects are realized by the provision of a number of moderator control members, hereinafter referred to as "filler" members, which are inserted into a boiling water nuclear reactor during start-up, and which are withdrawn after the operating level is realized. The filler members are of a material, such as aluminum, having low neutron moderation and low neutron absorption characteristics. The filler members thus have the nuclear characteristics of steam. In operation of the reactor the neutrons are allowed to "see" the artificial steam (i.e., the filler members), until the reactor warms up enough to provide real steam. Consequently, the invention allows the reactor to be designed to operate at high power levels without the resonance instability that would be associated with the reactor during start-up. The filler member according to the invention are to be distinguished from the well-known cadmium or boron control rods; the latter have high neutron absorption characteristics and would prevent the reactor from warming up at all if substituted for the filler members.

In the drawings, wherein like reference characters refer to like parts:

FIGURE 2 is a partially cut-away top plan view of the aparatus of FIGURE 1;

FIGURE 3 is a fragmentary sectional view of the apparatus of FIGURE 1;

FIGURE 5 is a fragmentary sectional view of apparatus similar to that illustrated in FIGURE 1, but embodying a different control arrangement according to the invention.

Figure 1:
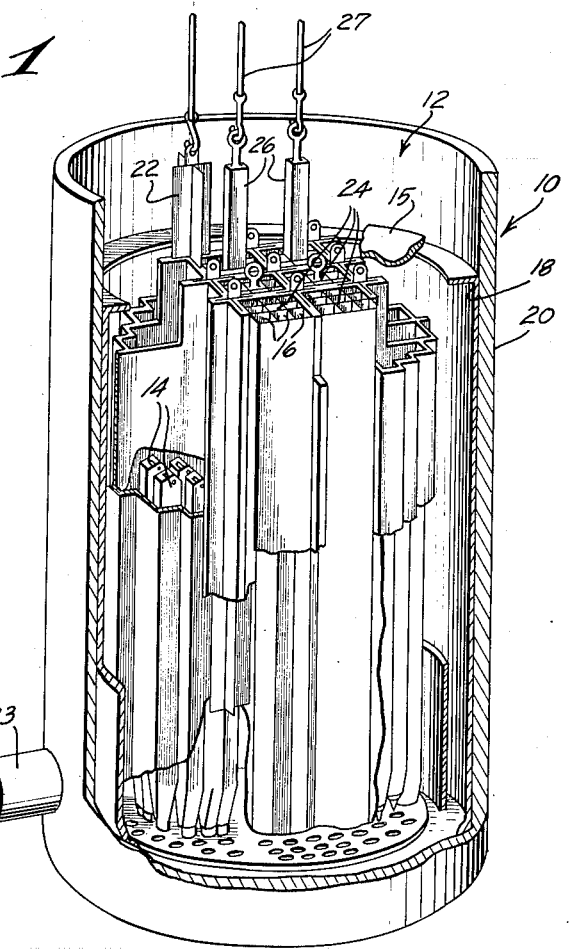
FIGURE 1 is a partially cut-away perspective view of a portion of a boiling water nuclear reactor using a control arrangement according to the invention.

The control arrangement of the invention will be described in FIGURES 1 to 3 in connection with one of the well-known types of boiling water nuclear reactors, such as the one described on the pages facing pages 52 and 53 of the Nucleonics magazine, July 1957 issue. The reactor 10 is comprised of an active core 12 in which are disposed a number of fissionable material or fuel assemblies 14. Each of the fuel assemblies 14 (FIGURE 3) is positioned within a passageway 16 in the core 12 and is made up of a number of spaced-apart fuel elements 17 (six elements in the example illustrated) mounted between a pair of supports 19. Each of the fuel elements 17 includes fissionable material such as natural uranium or uranium 238 artificially enriched with uranium 235. The core 12 (FIGURE 1) is housed within a thermal shield 18 having a cover portion 15 through which control elements enter and exit the core 12. The cover portion 15 is removed when fuel assemblies are inserted into or removed from the core 12. The thermal shield 18 is in turn contained within an outer casing 20 that confines water (not shown) within the reactor, the water serving the dual function of a neutron moderator and a coolant. The water enters the casing 20 through an inlet 23, picks up heat in the reactor to form steam, and then leaves the reactor in the form of steam through an outlet (not shown) in an upper portion of the reactor. The steam leaving the reactor will be moderately radio-active so the equipment using the steam must be well shielded.

The core 12 (FIGURES 2 and 3) also contains a number of passageways 21 adapted to receive the usual cadmium control rods 22 for determining the level of activity of the reactor, and also contains a number of other passageways 24 each adapted to receive a water moderator control or filler member 26 according to the invention. Each of the filler members 26, which is here exemplified as a hollow aluminum container with the hollow filled with air, is mounted for movement into and out of the core 12. To this end each of the filler members 26 (FIGURE 1) is attached to a cable 27 for lowering and raising the filler members into and out of the core 12. The cables 27, in turn, are connected to well known drive arrangements (not shown) for controlling the vertical position of the filler members 26. Two of the filler members 26 are shown in FIGURE 1 partially inserted into the core 12. The other usual devices associated with boiling water reactors will not be further described since they are well known in the art and are well described in the literature, for example in the magazine article referred to.

As will be explained, each of the filler members 26 is of a material such as aluminum, magnesium, bismuth, or other material having a neutron moderating characteristic appreciably less than that of water and having a neutron absorption cross section or characteristic at least as small as that of water. As has been indicated above, each of the moderator or filler members 26 is mounted for insertion into the core 12 for displacement of a portion of the water therein. Thus the insertion of the filler members 26 into the core 12 removes moderator from it in a manner similar to that effected by steam. The effective void in the moderator associated with the filler members 26, however, is "firm," that is, the void cannot vary with changes in reactor power and temperature; the void associated with steam, in contrast, is "unfirm," that is, the void varies with changes in reactor power and temperature.

Figure 4:
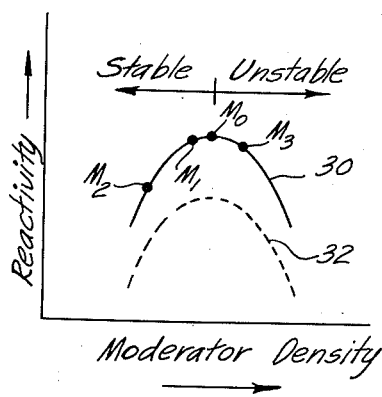
FIGURE 4 is a graph illustrating an aspect of the operation of a boiling water nuclear reactor embodying the invention.

The phenomena of reasonance instability will now be discussed in connection with FIGURE 4. As illustrated by a graph line 30, for a given nuclear reactor there is a certain optimum moderator density $M_0$ which gives a maximum reactivity with a given density of fissionable fuel. On the one hand, in order to avoid any tendency toward instability, a given reactor must be operated at a moderator density $M_1$ slightly less than and toward the stable side of $M_0$ both during start-up and during normal operation of the reactor. On the other hand, it is desirable to operate the reactor in a region where the slope of curve 30 is not steep (at $M_1$) to avoid large changes in reactivity (leading to oscillations in power output) with small changes in moderator density. (Small changes in moderator density occur as a result of the random formation of steam bubbles.) Operation of the reactor in a steep region of curve 30 (around $M_2$) thus limits the operation of the reactor to a small fraction, such as one-fifth, of its designed capacity in order that the peak power output (during the oscillations referred to) never exceed the designed capacity. Consequently, if the reactor could always be operated where the slope of curve 30 is small (around $M_1$) the reactor could be operated close to its designed power capacity since no reserve would then be needed to allow for the oscillations.

However, previous reactors could not be operated at $M_1$ during normal operation. Since water is denser when the reactor is cold than when it is heated to operating temperature, and steam bubbles are not present during start-up of the reactor but are present during normal reactor operation, the moderator density of a given reactor is higher during start-up than during normal operation. Thus, if the moderator density is $M_1$ during start-up, the moderator density during operation would be $M_2$, where the reactivity is substantially less than at moderator density $M_1$ and where the power output is more likely to oscillate; and the usual reactor cannot be started up at point $M_3$ to compensate for the reduction in moderator density during normal operation due to the instability tendency at points along curve 30 to the right of $M_0$. Thus, previous boiling water reactors have had to operate at a small fraction of their capacity.

The control method and apparatus according to the invention allows the reactor to start up at $M_2$ and to operate at full power at $M_1$ without attendant tendency toward oscillation in power. This is realized by inserting into the core 12 a number of the filler members 26 referred to. These filler members 26 have the nuclear characteristics of steam, that is, they are characterized in providing low neutron moderation and having a low neutron absorption cross section. The filler members 26 are inserted into the passageways 24 provided for them so as to reduce the effective moderator density from $M_3$ to $M_1$ during start-up. As the reactor warms up the moderator density decreases from $M_1$ to $M_2$, whereupon the filler members 26 are removed from the core. Upon removal of the filler members 26 the moderator density reverts to point $M_1$ giving a high power output unfraught with resonance instability. The filler members 26 referred to can be distinguished from the well-known cadmium or boron control rods by the fact that a substitution of cadmium control rods for the filler members referred to would move the curve 30 to a position of lower power reactivity, for example, to the reactivity represented by curve 32, but would not shift any of the M points along the curve. The control rod would thus shift the height of the curve 30 but would not change its shape. The apparatus for moving the filler members 26 into and out of the reactor core may be similar to the apparatus described in the article referred to for moving cadmium control rods into and out of the reactor core.

The filler members 26 referred to are illustrated in FIGURES 2 and 3 as being hollow aluminum containers. It will be appreciated, however, that the filler members may instead take other forms as long as they serve to reduce the moderator density without substantially engaging in neutron capture. For example, each of the filler members of FIGURE 5 takes the form of solid aluminum bars 36 mounted for movement into and out of the spaces between some of adjacent fuel elements 17 of each fuel assembly 14. In the embodiment of FIGURE 5 the filler member bars 36 are more evenly distributed throughout the fuel assemblies 14 than they are in the arrangement of FIGURES 2 and 3. However, the arrangement of FIGURES 2 and 3 is preferred since it is easier to control the movement of the filler members in the latter case.

From the foregoing it is seen that the method and apparatus of the invention provides increased flexibility of control over the reactivity of a nuclear reactor and enables the level of moderator density in such a reactor to be controlled independent of the reactivity of the reactor.

What is claimed is:

1. Method of operating a boiling water nuclear reactor core, comprising the steps of: displacing water moderator by inserting into said reactor core a plurality of moderator control elements, each of a material having a neutron moderation characteristic appreciably less than that of water and having a neutron absorption characteristic at least as low as that of aluminum, therefore displacing a determinable portion of the water moderator of said reactor core from proximity of the core during low temperature operation when the water moderator is most dense; raising the power level of operation of said reactor core, and then withdrawing said control elements from said reactor core.

2. In a boiling water nuclear reactor core having neutron absorbing control means, a method of operation to compensate for temperature effects, comprising the steps of: displacing water moderator by inserting into said reactor core a plurality of moderator control elements, each of a material having a neutron moderation characteristic appreciably less than that of water and having a neutron absorption characteristic appreciably less than that of the control means, therefore displacing a predetermined portion of the water moderator of said reactor core from proximity of the core during low temperature operation when the water moderator is most dense; raising the power level of operation of said reactor core by removing at least partially the control means, and then withdrawing said control elements from said reactor core.

3. A method of operating a boiling water nuclear reactor core which has a water moderator density reacting curve which is steep in slope except at maximum reactivity and which has its maximum reactivity at intermediate density, comprising the steps of: operating said reactor at a low power and a moderator density above that corresponding to that of said maximum; displacing the water moderator by inserting into said reactor core a plurality of moderator control elements, each of a material having a neutron moderation characteristic appreciably less than that of water and having a neutron absorption characteristic at least as low as that of aluminum, therefore displacing a determinable portion of the water moderator of said reactor from proximity of the core during low temperature operation when the water moderator is most dense; raising the power level of operation of said reactor core; and then withdrawing said moderator control elements from said reactor core.

References Cited in the file of this patent

UNITED STATES PATENTS 2,832,732    Wigner  ---------------- Apr. 29, 1958

(Other references on following page)

OTHER REFERENCES

TID-7532 (Pt. 1), "Reactor Control Meeting Held in Los Angeles, Mar. 6-8, 1957," USAEC report published October 1957; pages 188, 189, 197, 199-201.

Research Reactors (TID-5275), U.S. Government Printing Office (1955); pages 105, 116.

Nucleonics, vol. 15 July (1957), pages between pages 52 and 53, pages 60-63 (article by Harrer).

Nucleonics, vol. 13 (December 1955); pages 42, 45 (article by Macphee).

UNITED STATES PATENT OFFICE
CERTIFICATE OF CORRECTION

Patent No. 3,036,964            May 29, 1962

Wendell A. Horning

It is hereby certified that error appears in the above numbered patent requiring correction and that the said Letters Patent should read as corrected below.

Column 1, line 55, for "member" read -- members --; column 3, line 40, before "capacity" insert -- designed --.

Signed and sealed this 30th day of October 1962.

SEAL)
Attest:

RNEST W. SWIDER            DAVID L. LADD
Attesting Officer            Commissioner of Patents